(12) United States Patent
Antosz

(10) Patent No.: US 6,952,807 B1
(45) Date of Patent: Oct. 4, 2005

(54) VEHICLE SUPPLY CHAIN ANALYSIS SYSTEM

(75) Inventor: Steven Antosz, Ortonville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 400 days.

(21) Appl. No.: 09/494,690

(22) Filed: Jan. 31, 2000

(51) Int. Cl.[7] .............................................. G06F 3/00
(52) U.S. Cl. ..................................... 715/810; 715/765
(58) Field of Search ............................... 345/746, 762, 345/763, 764, 765, 771, 810, 835, 846, 847, 345/731, 965; 705/8, 28, 1, 9, 201, 10, 7

(56) References Cited

U.S. PATENT DOCUMENTS

| | | | |
|---|---|---|---|
| 4,813,013 A * | 3/1989 | Dunn ........................... 345/618 |
| 5,237,497 A * | 8/1993 | Sitarski .......................... 705/8 |
| 5,850,221 A * | 12/1998 | Macrae et al. ............. 345/853 |
| 5,887,154 A | 3/1999 | Iwasa et al. .................... 703/6 |
| 5,896,138 A * | 4/1999 | Riley ........................... 345/440 |
| 5,931,900 A | 8/1999 | Notani et al. ................ 709/201 |
| 5,946,662 A | 8/1999 | Ettl et al. ....................... 705/14 |
| 5,953,707 A | 9/1999 | Huang et al. ................... 705/1 |
| 5,963,919 A | 10/1999 | Brinkley et al. .............. 705/22 |
| 5,974,395 A | 10/1999 | Bellini et al. ................ 705/10 |
| 5,995,945 A | 11/1999 | Notani et al. ................... 705/1 |
| 6,121,965 A * | 9/2000 | Kenney et al. ............. 345/810 |
| 6,157,915 A * | 12/2000 | Bhaskaran et al. ............ 705/1 |
| 6,380,951 B1 * | 4/2002 | Petchenkine et al. ....... 345/736 |
| 6,442,512 B1 * | 8/2002 | Sengupta et al. .............. 703/6 |
| 6,486,899 B1 * | 11/2002 | Bush, Jr. ..................... 345/855 |

\* cited by examiner

Primary Examiner—John Cabeca
Assistant Examiner—B. Detwiler
(74) Attorney, Agent, or Firm—Ralph E. Smith

(57) ABSTRACT

A computer implemented supply chain analysis apparatus permits user to create a supply chain map for analyzing a manufacturing operation. A template forms a workspace to depict a supply chain related to a manufacturing operation. Supply chain icons are predefined to depict specified aspects and relationships of an automotive supply chain function. The stencil stores icons which are related to a manufacturing area. The icons which are related to a manufacturing area are grouped together on a stencil.

11 Claims, 10 Drawing Sheets

Screen accessed through hyperlink

| Product Information | | | | |
|---|---|---|---|---|
| Part Name: | | | | |
| Supplier: | | Location: | | |
| MY Introduced | | | | |
| PPAP Date: | | | | |
| PPM? | __ 99 | __ 98 | __ 97 | |
| Who Lead PSO? | | | | |
| Warranty Issues? | NO    YES | If YES, explain: | | |
| QS9000 certified? | NO/YES | | | |
| Component Information | | | | |
| Component Name/Process | Supplier Name | Supplier Location | Component | |
| | | | Transport | Packaging |
| | | | | |

*Fig-2*

Definitions of Icons & Supply Chain Shapes

| Icon | Definition |
|---|---|
|  | Tier 3 and beyond- furnish goods/services to a Tier 3 & beyond supplier |
|  | Tier 2 Supplier- furnish goods/services to a Tier 1 supplier |
|  | Tier 1 Supplier- furnish goods/services directly to DaimlerChrysler facility |
|  | Warehouse- building that stores goods/materials |
|  | DC Assy/Mfg- represents a DaimlerChrysler manufacturing or assembly plant |
|  | MOPAR Depot- includes Service & Parts Distribution Centers |
|  | Homologation/Consolidation- location center that combines goods for standard distribution |
|  | Border Crossing- represents an international crossing |
|  | Transportation Trailer- transporting material by roadway |
|  | Transportation (TBD/other)- includes non-standard transportation methods (e.g. air carrier) |
|  | Transportation Ocean- transporting goods/materials by ship |
|  | Transportation Rail- transporting materials by railroad |
|  | Finished Part- represents a completed components/assembly |
|  | Component/Sub Assy- represents a component or sub-assembly of the finished part |
|  | Dealership- franchise or company-owned facility to market cars/trucks in an area |
|  | DLC/Plant Provider- Dedicated Logistics Carrier or ILC |
|  | Customer- purchaser of DaimlerChrysler automotive product |
|  | Hazardous Material- represents products that present danger to humans and/or the environment |
|  | Recycle- process to re-direct materials for re-use |
|  | Terminal- represents electronic communication (e.g. EDI) |
|  | Database- information management system |
|  | Bottleneck- represents a process step that slows up progress |
|  | Process - a series of steps required to furnish the completed goods/service |
|  | Inspection Measurement- represents examination of goods/service |
|  | Packaging- represents the container utilized to transport goods (includes rack returns) |
|  | Opportunity- represents the identification of improvements in cost, quality, and cycle time |
|  | Supply Chain Risk- represents a chance of exposure or loss |
|  | Lead-time- represents the time required |

*Fig-7*

VEHICLE SUPPLY CHAIN ANALYSIS SYSTEM

FIELD OF THE INVENTION

The present invention relates generally to supply chain mapping, and more particularly to a computer-implemented system for identifying opportunities and risks in supply chains.

BACKGROUND

A supply chain includes networks of suppliers, transportation carriers, fabrication sites, assembly locations, distribution centers, and customer locations by which components, services, information and products flow. The raw materials, components and services that result in end products and components occur at a variety of levels in a supply chain. The variety of levels assemble raw components into more complex components which may be processed or combined with additional components at yet other levels in the supply chain. The components are eventually brought together to manufacture end products.

The demand of products from the consumer drives a supply chain. The demand creates activity along the supply chain. The activity along the supply chain consists of services or processes characterized by information such as supplier name, component name, and part's manufacturing location.

Large automotive manufacturing organizations utilize extremely large supply chains involving multiple products or components supported by multiple levels of processes or services. Large manufacturing organizations have complex and substantially large supply chains, so that determining the flow within the supply chain is often difficult. Furthermore, these supply chains often change rapidly such that products or components have short lifetimes and new products or components are introduced frequently into the supply chain. Thus, complex supply chains having a large and dynamic structure require assessment of the entire chain to determine risks or where improvements can be made.

SUMMARY OF THE INVENTION

In accordance with the teachings of the present invention, a computer implemented supply chain mapping system is provided. A template supplies a workspace that allows a graphic depiction of a supply chain network related to a vehicle manufacturing operation through the use of icons. Each icon pictorially indicates a supply chain function. The icons are arranged on a stencil located in the template. The stencil arranges icons according to related manufacturing interests.

Additional advantages and aspects of the present invention will become apparent from the subsequent description and the appended claims, taken in conjunction with the accompanying drawings in which:

BRIEF DESCRIPTION OF THE DRAWINGS

The present invention will become more fully understood from the detailed description and the accompanying drawings, wherein:

FIG. 2 is a computer screen display of the present invention's general information template;

FIG. 7 is a graphical display of the present invention's icons;

DETAILED DESCRIPTION OF THE PREFERRED EMBODIMENTS

The present invention's supply chain mapping is utilized in a global extended enterprise network to visualize the enterprise and identify risks and opportunities in the manufacturing process. It should be appreciated that other industries besides the automotive industry can utilize the present invention's supply chain mapping system. A supply chain of the present invention focuses on the process and involves appropriate suppliers, processes, logistics, and other automotive manufacturing factors from all tiers in the supply chain. Supply chain mapping can be used to analyze and establish an efficient and timely flow of material, services and information. The supply chain network contains elements that impact cost, quality, cycle time and technology. Supply chain mapping typically starts with the raw material supplier and ends with the final consumer. Furthermore, the supply chain verifies improvements in quality, total systems cost, cycle time, and technology advancement.

Figure 1:
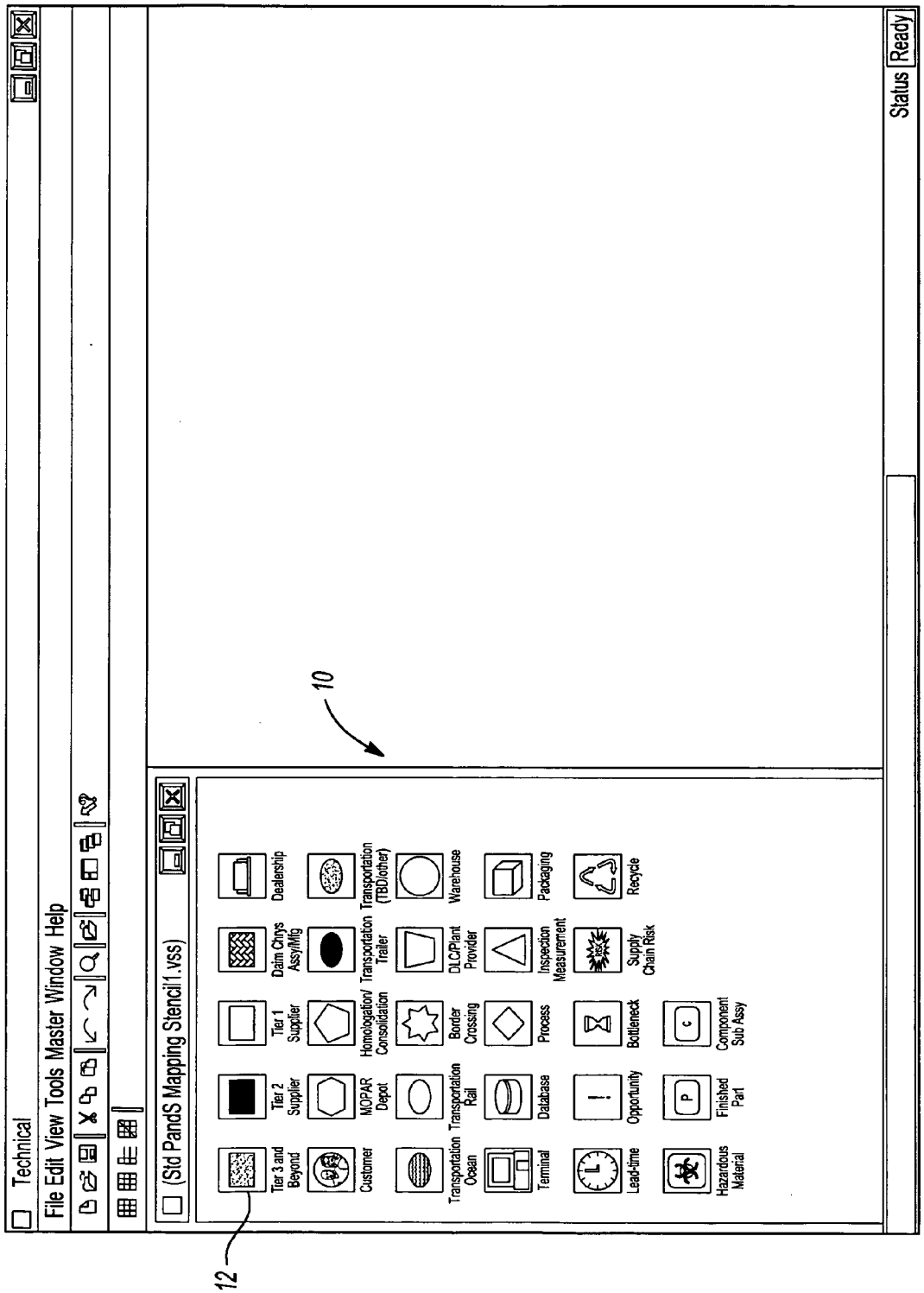
FIG. 1 is a computer screen display of the present invention's stencil.

FIG. 1 shows a mapping stencil 10 of the present invention that arranges icons 12 into a grouping. Icons 12 are related to vehicle manufacturing factors. By way of example, FIG. 7 illustrates icons for use in supply chain maps; however, it should be appreciated that other vehicle manufacturing factors can be represented by an icon. In the preferred embodiment, stencil 10 has icons 12 related to vehicle manufacturing areas including, Tier Three Supplier, Tier Two Supplier, Tier One Supplier, Assy/Mfg, Dealership, Customer, MOPAR Depot, Homologation Consolidation, Transportation Trailer, Transportation (TBD/other), Transportation Ocean, Transportation Rail, Border Crossing, DLC/Plant Provider, Warehouse, Terminal, Database, Process, Inspection Measurement, Packaging, Leadtime, Opportunity, Bottleneck, Supply Chain Risk, Recycle, Hazardous Material, Finished Part and Component/Sub Assy. It should be appreciated that a stencil can relate to specific areas of vehicle manufacturing and an icon represents any factor associated with this network. Stencils directed towards process flow information, transportation, environmental information and supplier information provide a user with icons that are specific to a user's interest in evaluating the supply chain. For example, a user interested in evaluating efficient process flow may need to represent such manufacturing factors as lead time and bottlenecks, but may choose not to prioritize a need to represent transportation and packaging aspects.

The stencil by grouping related icons facilitates the user's needs in forming a supply chain map. By using a stencil, the user interested in process flow can concentrate on creating a comprehensive supply chain map of the process flow. After a supply chain for the automotive process flow is established, the user can continue to create other views of the supply chain. For example, a stencil specifically for environmental information can help a user focusing on process flow to develop a supply chain map that includes environmental information. A variety of environmental related icons are arranged in a stencil. Such a user may not ordinarily consider or be familiar with environmental factors in developing a supply chain, however, the stencil provides the user with a base from which environmental factors represented by icons are quickly introduced to and selected by the user for integration into the supply chain. The use of such a stencil permits the user to build a supply chain that is comprehensive and considers a variety of factors.

In the preferred embodiment, each icon represents a factor in the supply chain such as, but not limited to, suppliers, processes and components. Each of the icons 12 arranged on the stencil 10 can be selected by the user and moved to the template workspace to create a supply chain map. Each of the icons 12 preferably has a textual representation of attributes related to the supplier, process or component represented by the icon 12, and can be modified after placed in the workspace of the perspective template. Each icon also can be linked to an information template 20 as shown in FIG. 2.

FIG. 2 illustrates the screen accessed through a hyperlink. An exemplary information template 20 with data related to a supplier icon and includes, but is not limited to, data indicating part name, supplier, location, the date the part was introduced, cost, warranty issues, and quality issues.

FIGS. 3, 4, 5 and 6 depict a perspective template having a supply chain 70. The supply chain interconnects a number of levels of suppliers that provide raw materials, and assemble and manufacture components that result in a finished part 66. The Tier One Supplier 52, Tier Two Supplier 54 and Tier Three Supplier 56 are represented by icons and identified by the level in which they function in the supply chain. A supplier that provides the end product 66 is a tier one supplier. A tier two supplier provides a component to the tier one suppliers, and a tier three supplier represents any supplier that provides components to the supply chain before tier two suppliers. Other supply or demand entities are also represented by icons, include, but are not limited to, assembler/manufacturers, dealers and customers. The supply related icons can also be arranged together on a stencil and provided for use in the perspective template.

Logistics operations and carrier operations, including transportation for moving sub-components between suppliers are represented in the supply chain. In the preferred embodiment, trailer, TBD/other, ocean, rail, border crossings and plant provider icons represent transportation related events, however it should be appreciated that other modes of transportation can be incorporated as icons. The logistics related icons can also be arranged on a stencil and provided for use in the perspective template.

Process flow information and quality control are represented in the supply chain. Icons representing processes, inspection measurements, lead times, bottlenecks and packaging are given by way of example; however, it should be appreciated that other process flow information could be represented by icons. Computer terminals and databases are also represented by icons in the supply chain. The process flow related icons can also be arranged on a stencil and provided for use in the perspective template.

Environmental information is represented in the supply chain map. Icons representing recycling, and hazardous materials, are given by way of example, however it should be appreciated that other environmental information could be represented. The environmental related icons can also be arranged on a stencil and provided for use in the perspective template. Opportunities and supply chain risks are represented by icons to provide an evaluation of the supply chain.

Figure 3:
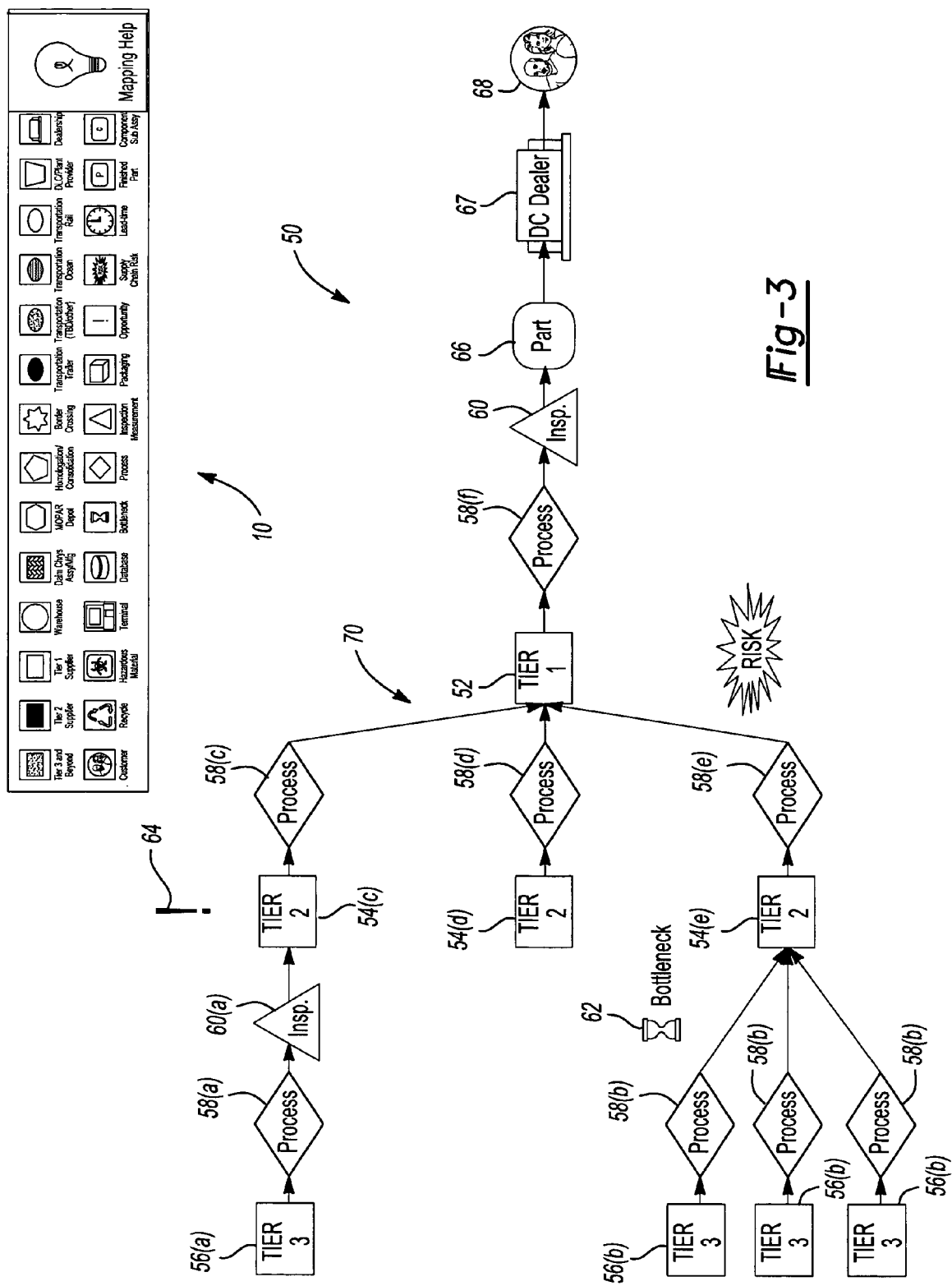
FIG. 3 is a computer screen display of the present invention's supplier process perspective template.

FIG. 3 depicts a supplier process perspective template 50 and a stencil 10. The supplier process perspective template generally depicted at 50, has a workspace pre-populated with icons forming a supply chain map 70. The icons are selected to pre-populate the template based on the area of interest of the user. For example, if the user is interested in process control, the critical supply chain icon which represents factors that impact cost, quality, and cycle time regarding process control, pre-populate the template. In the preferred embodiment, the supply chain map 70 is for a finished part 66.

The finished part 66 is downstream in the supply chain map 70. Raw materials, suppliers, processes, and component that are inclusive in producing a finished part tire provided upstream relative from the finished part. Raw materials, suppliers, processes, and components flow in the supply chain from left to right.

With a continued reference to FIG. 3, the supply chain map 70 shows three tiers of suppliers tier three suppliers 56, tier two suppliers 54 and tier one suppliers 52. Downstream from each of the supplies are processes 58. Inspection measurements 60 are located throughout the supply chain map 70.

Each of the tier three suppliers 56 is associated with a process 58 located downstream. Tier three supplier 56(a) is associated with process 58(a). An inspection measurement 60(a) is associated with process 58(a). Process 58(a) is associated with second tier supplier 58(c). An opportunity 64 is associated with second tier supplier 54(c) and indicates a realizable benefit in the supply chain. Resulting benefits in the supply chain are based on improvements in cost, quality, and flow efficiency.

Each of the suppliers 56(b) is associated with a process 58(b) located downstream. Each of the processes 58(b) connects to a second tier supplier 54(e). The components that flow from each of the third tier suppliers 58(b) to second tier supplier 54(e) create a bottleneck 62. The bottleneck 62 indicates potential problems in the supply chain.

Each of the second tier suppliers 54(c), 54(d), and 54(e) are associated with processes 58(c), 58(d), and 58(e), respectively. A first tier supplier is associated with each of the processes 58(c), 58(d), and 58(e). A process 58(f) is associated with first tier supplier 52. An inspection measurement 60 is associated with process 58(f). A finished part 66 is associated with inspection measurement 60. The finished part then moves in the supply chain map to dealer 67 and then to customers 68.

Figure 8:
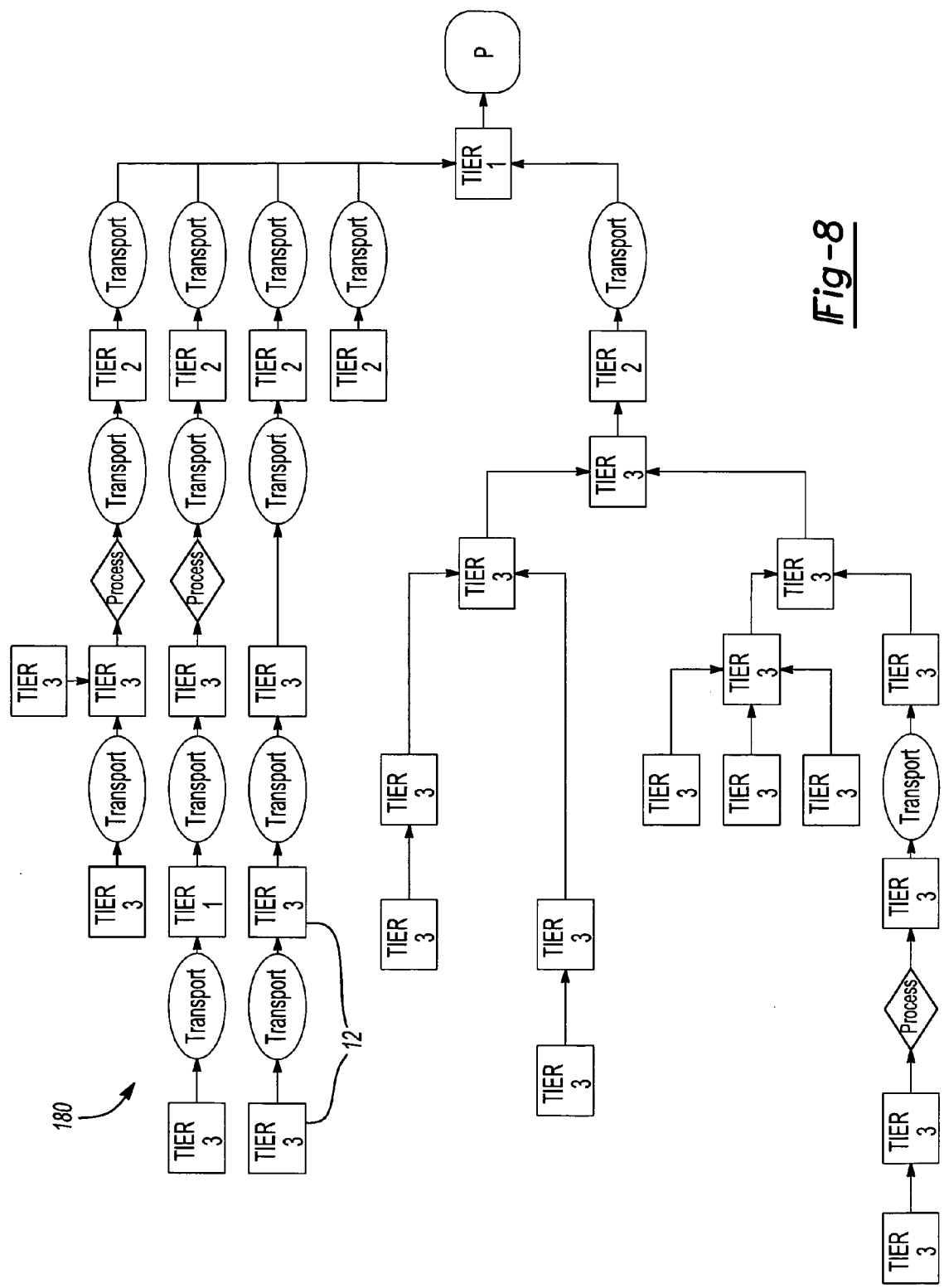
FIG. 8 is a computer screen display of the present invention's icons with textual information.

As discussed above, each of the icons preferably has textual information visually displayed in the icon. In the preferred embodiment, for example, each supplier-related icon 56, 54 and 52, includes textual information identifying: component name, supplier name, supplier location and part number. The textual information is preferably modifiable on the template. FIG. 8 shows a template 180 and icons 12 where each icon includes textual information.

The supply process perspective template 50 provides a user interested in the process flow with a framework. The user can use the supply process perspective template and build a more complex supply chain by modifying and adding icons. The pre-populated icons of the supply process perspective template allows a user to begin with a framework that guides the user to create a supply chain in a visually evaluative and modifiable workspace. For example, the supply process perspective template includes inspection measurements that should be identified and used throughout the supply chain. Risk icons and opportunity icons should also be utilized in the supply chain map based on criteria such as, but not limited to, where an inspection measurement icon does not appear between process icons, and, therefore indicates a potential problem. The user can view the pre-populated template and understand the manner in which to map inspection measurements, risks and opportunities.

Figure 4:
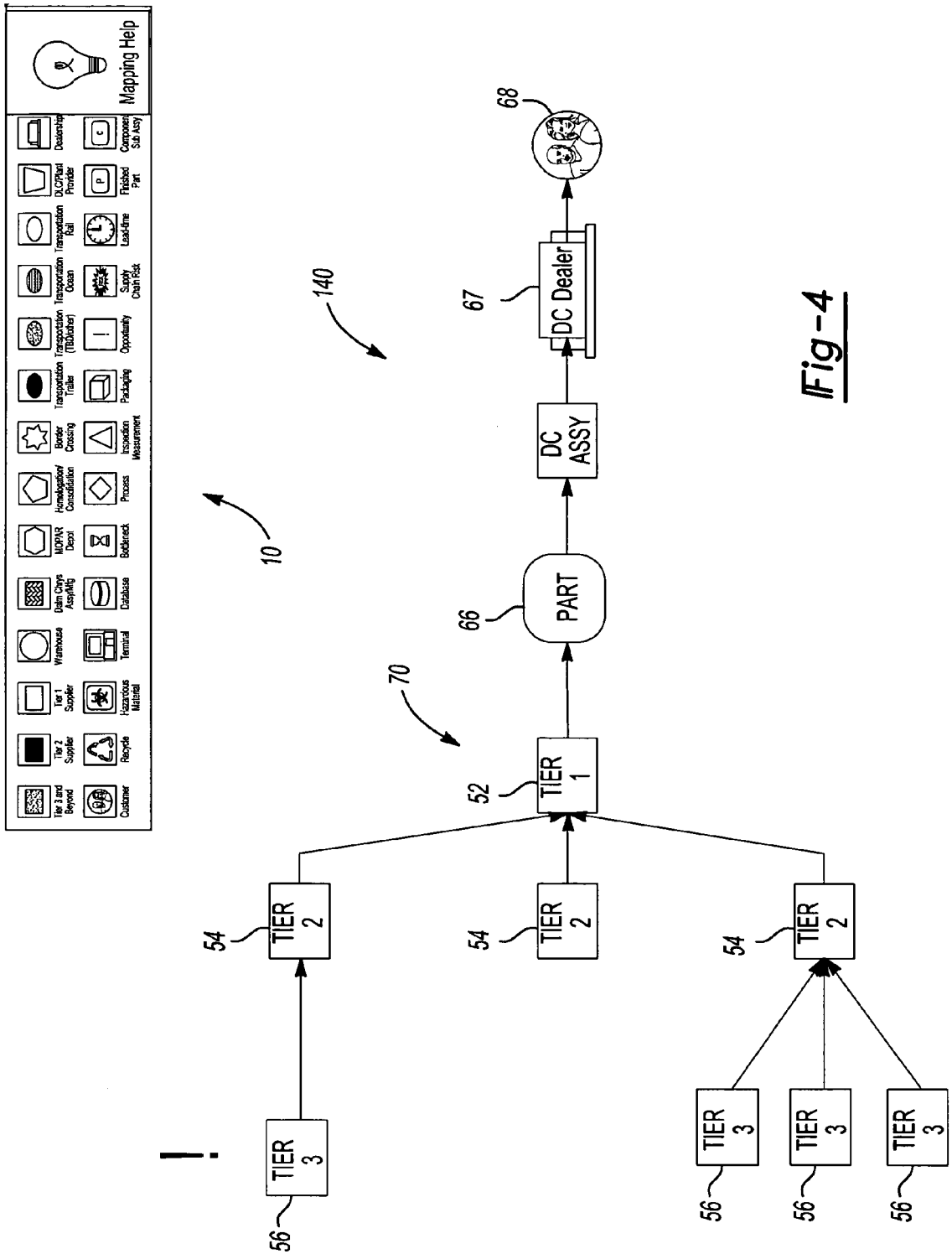
FIG. 4 is a computer screen display of the present invention's supplier perspective template.
Figure 5:
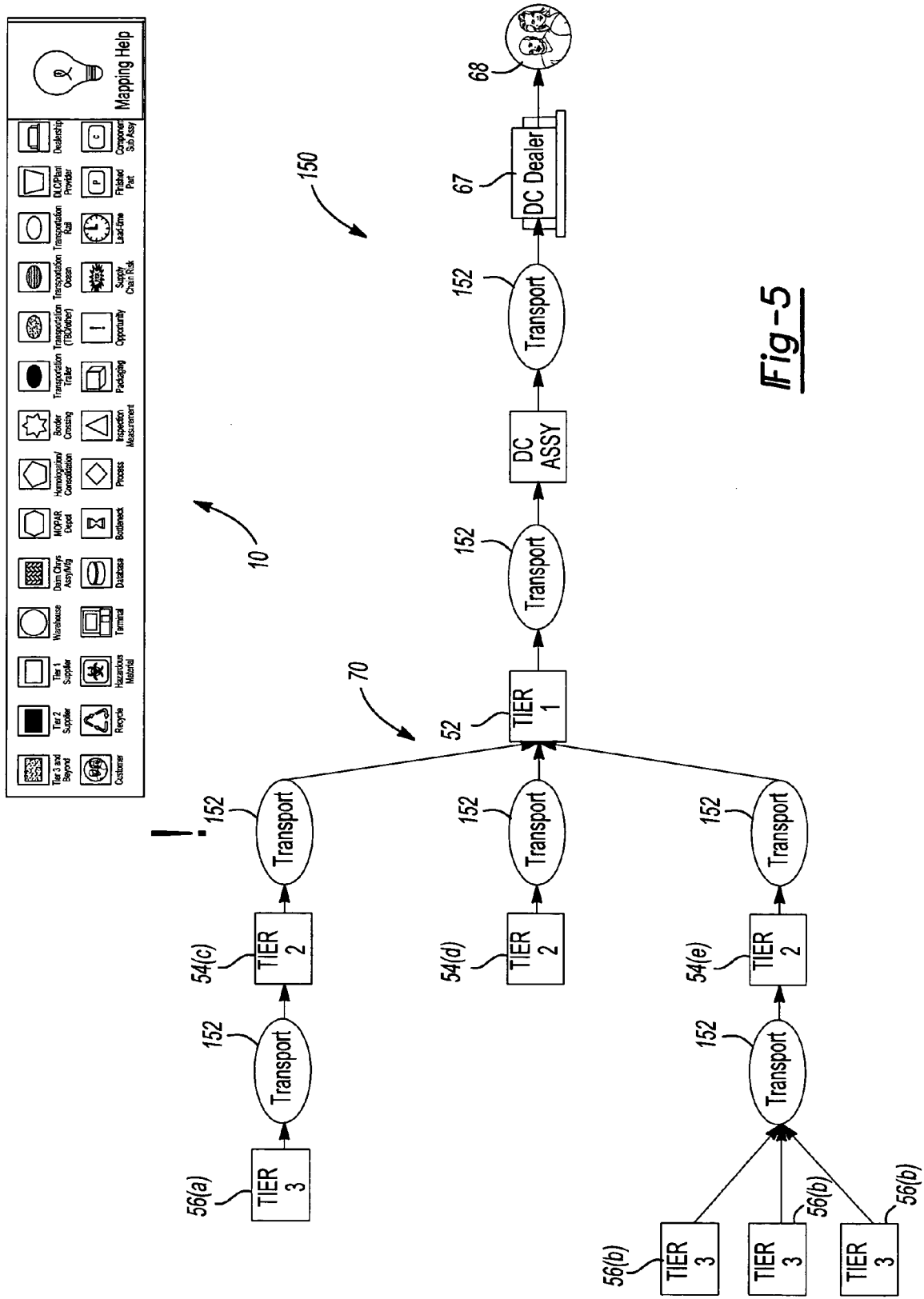
FIG. 5 is a computer screen display of the present invention's logistics template.
Figure 6:
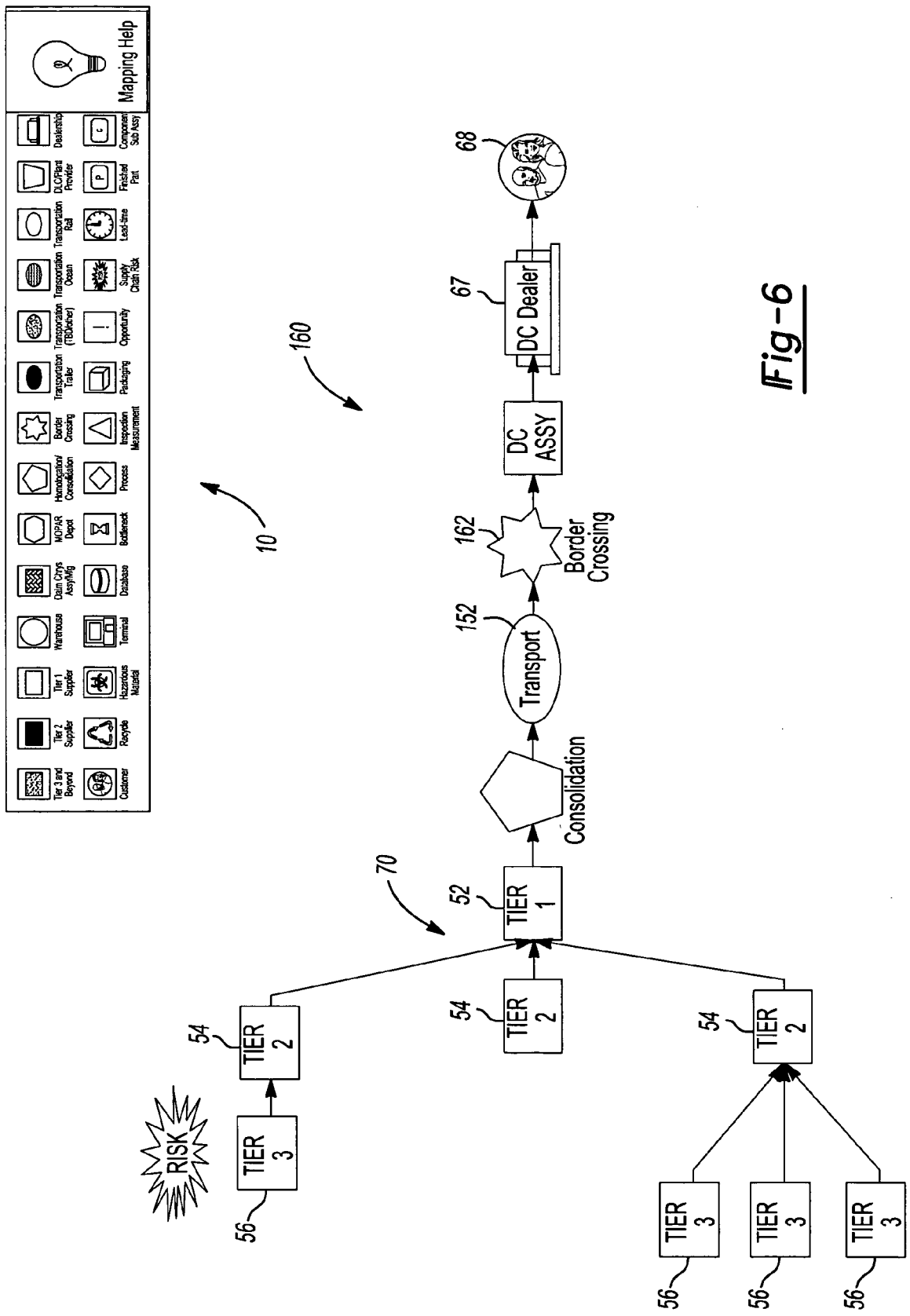
FIG. 6 is a computer screen display of the present invention's international template.

FIG. 4 illustrates a supplier perspective template 140 that is pre-populated with icons related to a supplier perspective. The supplier perspective template 140 focuses on the suppliers and the associated components or services offered in the supply chain. FIG. 5 illustrates a logistics perspective template 150 that is pre-populated with icons related to logistics, including transportation 152. The logistics perspective template 150 includes transportation related icons that focus a user to map transportation before considering other areas of vehicle manufacturing. FIG. 6 illustrates international perspective template 160 that is pre-populated with icons related to international factors, such as border crossing 162. The international perspective template 160 allows the user to first focus on international related areas of vehicle manufacture in the supply chain. The perspective templates offer a way in which a variety of users build, evaluate, and modify a supply chain map containing comprehensive and substantially uniform information. The different perspective templates can be interrelated via a hyperlink connection.

Figure 9:
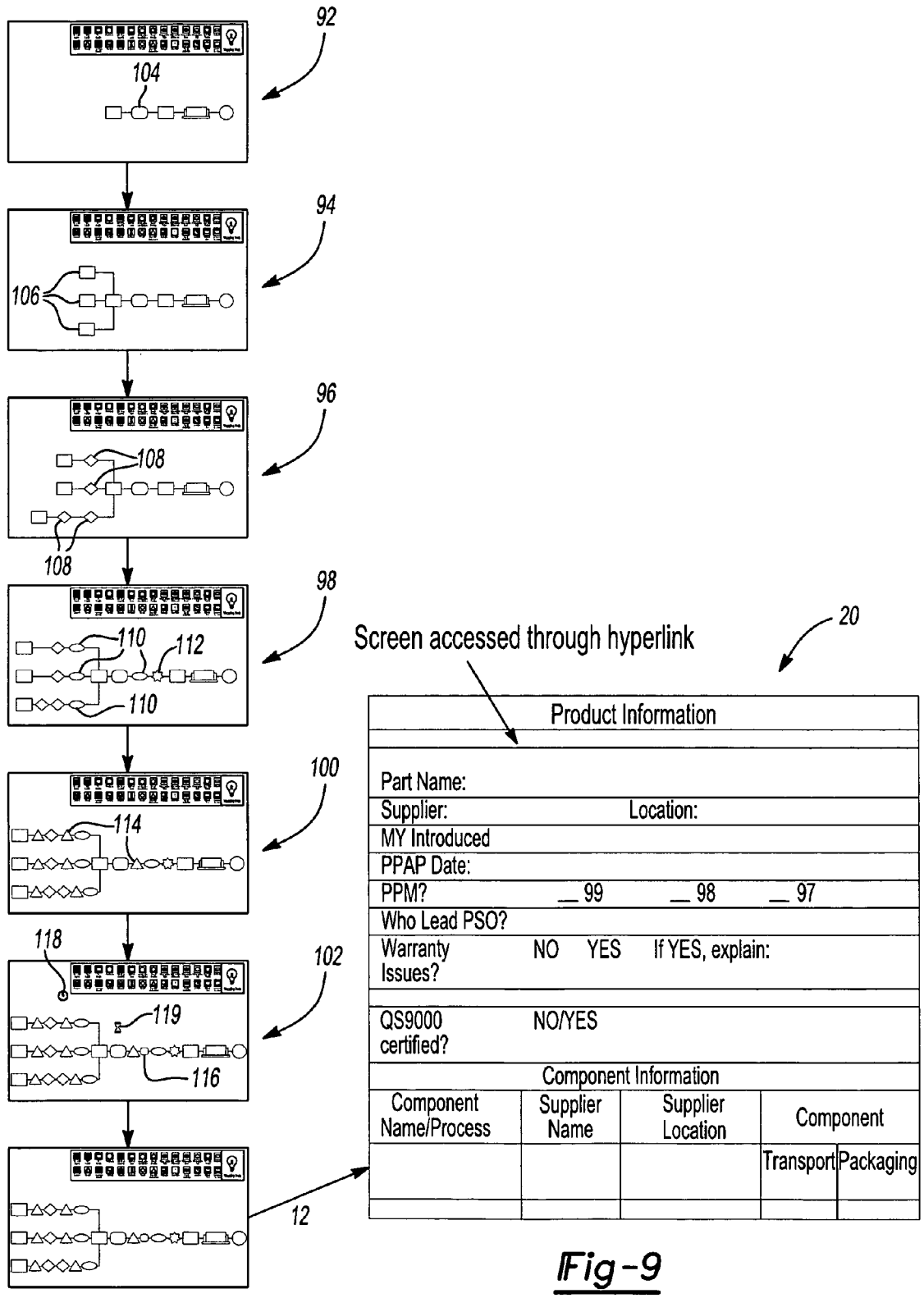
FIG. 9 is a flow chart depicting the operational sequence of the present invention.

FIG. 9 illustrates a sequential computer screen display flow chart depicting the operational sequence for the preferred embodiment. Computer screen display 92 identifies the part 104 in the supply chain map. Computer screen display 94 identifies the components 106 in the assembly. For each component, the supplier, supplier location and part number is identified by textual information placed within the icons. Computer screen print 96 indicates the processes 108 that each part must go through before it reaches the next supplier in the supply chain map. Computer screen display 98 indicates transportation 110, border crossings 112. Computer screen display 100 identifies inspection measurements 114. Computer screen display 102 identifies part storage 116, lead time 118 and bottlenecks 119. Information template 20 is accessed through a hyperlink of individual icons 12.

Figure 10:
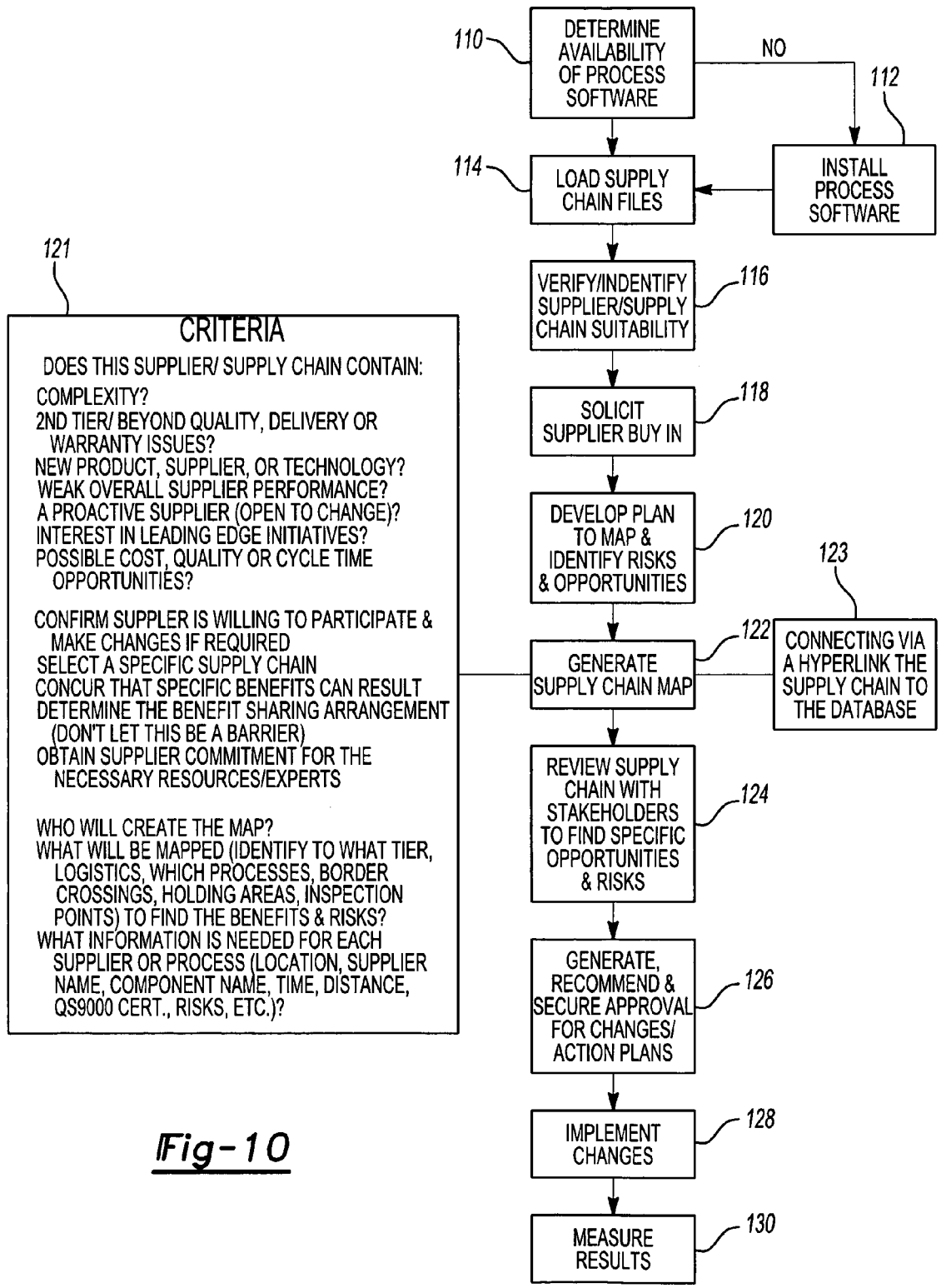
FIG. 10 is a flow diagram showing supply chain mapping of the present invention.

FIG. 10 is a flow diagram showing supply chain mapping and analysis using a supply chain map of the present invention. Decision block 110 determines whether process mapping software is on a computer. Block 112 indicates that a process mapping software package is installed on a computer. Block 114 loads supply chain files onto the computer. Block 116 verifies or identifies supplier chain suitability. Block 118 solicits supplier buy in. Block 120 develops a plan to map and identify risks and opportunities. Block 122 generates a supply chain by using the process mapping software. The generation of the supply chain is based on the criteria of Block 121. Block 123 connects via a hyperlink the supply chain to a database repository for storing specific supply chain icon information. Block 124 reviews a supply chain with stakeholders to find specific opportunities and risks. Block 126 generates, recommends and secures approval for changes and creates action plans. Block 128 implements changes. Block 130 measures results of supply chain mapping.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer implemented apparatus for analyzing a manufacturing operation that contains a supply chain, said manufacturing operation having a plurality of manufacturing areas, said apparatus comprising:
   a template for supplying a workspace to depict the supply chain related to the manufacturing operation;
   icons which are predefined to depict factors of a supply chain; and
   a stencil for storing the icons associated with one of the manufacturing areas, wherein the template comprises a perspective template having at least one supply chain icon, the perspective template providing a pre-populated framework to evaluate the manufacturing operation.

2. The apparatus of claim 1 wherein said icons are selected from the stencil and moved to the template.

3. The apparatus of claim 1 further includes a plurality of icons that are connected to show a supply chain flow.

4. The apparatus of claim 1 further includes at least one stencil selected from the group consisting of process flow stencil, logistics stencil, and environmental stencil.

5. The apparatus of claim 1 wherein said perspective template is selected from the group consisting of international template, logistics template, supplier template, and supplier process template.

6. A computer implemented supply chain analysis apparatus comprising:
   a template for supplying a workspace to depict a supply chain related to a manufacturing operation;
   icons which are predefined to depict factors of an automotive supply chain; and
   a stencil for storing icons associated with a vehicle manufacturing area, wherein the template comprises a perspective template having at least one supply chain icon, the perspective template providing a pre-populated framework to evaluate the manufacturing operation.

7. The apparatus of claim 6 wherein said icons are selected from the stencil and moved to the template.

8. The apparatus of claim 6 further includes a plurality of icons that are connected to show a supply chain flow.

9. The apparatus of claim 6 further includes at least one stencil selected from the group consisting of process flow stencil, logistics stencil, and environmental stencil.

10. The apparatus of claim 6 wherein said perspective template is selected from the group consisting of international template, logistics template, supplier template, and supplier process template.

11. A system for analyzing a supply chain, the supply chain having multiple tiers of suppliers geographically removed from one another or from end users of products provided by the suppliers, and for optimizing a delivery process discovered using the system for analyzing the supply chain, the system adapted for use on a computer or network of computers, the system comprising:
   a graphical interface system comprising at least one perspective template having a pre-arranged supply chain representation, the supply chain representation configured to provide information about the supply chain in a format useful to a particular user or participant in the supply chain, and a stencil including a plurality of iconic representations of elements for inclusion in the supply chain representation by the particular user.

* * * * *